United States Patent [19]

Metcalfe et al.

[11] Patent Number: 5,406,337
[45] Date of Patent: Apr. 11, 1995

[54] SEMI-RIMLESS EYEGLASS FRAME ASSEMBLY

[75] Inventors: Richard T. Metcalfe, Sturbridge; Arthur J. Salce, Southbridge, both of Mass.

[73] Assignee: Cabot Safety Corporation, Southbridge, Mass.

[21] Appl. No.: 980,818

[22] Filed: Nov. 24, 1992

[51] Int. Cl.⁶ .................................. G02C 1/04
[52] U.S. Cl. .................... 351/109; 351/108; 351/131
[58] Field of Search ............... 351/103–109, 351/44, 124, 131

[56] References Cited

U.S. PATENT DOCUMENTS

| | | | |
|---|---|---|---|
| 2,369,527 | 2/1945 | Brown | 351/107 |
| 2,385,975 | 10/1945 | Ellestad | 88/47 |
| 2,513,214 | 6/1950 | Stegeman | 88/41 |
| 3,233,250 | 2/1966 | Jonassen | 351/44 |
| 3,824,006 | 7/1974 | Voit | 351/106 |
| 3,846,017 | 11/1974 | Ferrell | 351/106 |
| 4,102,566 | 7/1978 | Shelton | 351/131 |
| 4,202,609 | 5/1980 | Reese | 351/111 |
| 4,313,652 | 2/1982 | Berman | 351/106 |
| 4,432,616 | 2/1984 | Kurosaka | 351/106 |
| 4,511,226 | 4/1985 | Freeman | 351/57 |
| 4,561,734 | 12/1985 | Ayache | 351/103 |
| 4,670,915 | 6/1987 | Evans | 2/450 |
| 4,685,781 | 8/1987 | Wiedmann et al. | 351/110 |
| 4,723,844 | 2/1988 | Medina | 351/111 |
| 4,762,407 | 8/1988 | anger et al. | 351/204 |
| 4,842,399 | 6/1989 | Tsai | 351/106 |
| 4,951,322 | 8/1990 | Lin | 351/44 |
| 4,968,129 | 11/1990 | Grendol | 351/153 |
| 5,007,727 | 4/1991 | Kahaney et al. | 351/47 |
| 5,015,087 | 5/1991 | Baratelli | 351/65 |

FOREIGN PATENT DOCUMENTS 0068918 5/1992 European Pat. Off.
7913960 5/1979 France.

OTHER PUBLICATIONS

Fannin, Troy et al, *Clinical Optics*, Butterworth Publishers, 1987, p. 15.

*Primary Examiner*—Loha Ben
*Assistant Examiner*—Thomas Robbins

[57] ABSTRACT

Semi-rimless and rimless eyeglass frame assemblies. The semi-rimless frame assembly includes an eyewire extending along the upper and side edges of a lens, a nose bridge, and a pair of endpiece assemblies. The endpiece assemblies have channels for receipt of the eyewire and the lens, and through holes on each side of the channels, aligned with apertures in the lens, for receipt of means to secure the lens to the frame assembly. The endpiece assemblies are pivotally connected to temples.

13 Claims, 4 Drawing Sheets

SEMI-RIMLESS EYEGLASS FRAME ASSEMBLY

BACKGROUND OF THE INVENTION

1. Field of the Invention

This invention relates to an improved semi-rimless eyeglass frame assembly and a method of manufacturing the same.

2. Description of the Prior Art

Many types of rimless or semi-rimless spectacle or eyeglass frames are available to the public for many types of eyeglasses, including corrective, sunglasses, or safety eyeglasses. So-called "rimless" eyeglasses support the lenses at selected points, instead of having the edges of the lenses held in grooves in a surrounding plastic or metal frame. This type of construction generally provides the user with lighter weight and resulting comfort, as well as the ability to modify the lens dimension, or simply to replace a damaged lens. Eyeglass frames of this type also provide a more aesthetic appearance.

A rimless spectacle is disclosed in U.S. Pat. No. 4,102,566 to Shelton. This reference discloses the importance of each element used in the construction of the spectacle to provide the style and light weight desired. The disclosure specifically provides for a rimless spectacle front lens supporting assembly which includes a pair of lenses residing in a contiguous relationship, connected to a bar which extends across the brow of the wearer, and a novel nose bridge assembly which includes front and back members joined together to support the lenses.

U.S. Pat. No. 4,432,616 to Kurosaka discloses a frame for a pair of spectacles which allows for adjustments in the dimensions of the frame to accommodate a wide range of lens sizes and shapes. Kurosaka teaches the use of a spectacle frame wherein the lenses are retained within rims by thin wires. A groove is formed around the outer peripheral edge of each lens and a protrusion on the rim engages the groove on the upper edge as the wire engages the groove on the lower edge.

Other rimless or semi-rimless eyeglasses provide users with the ability to interchange lenses easily. U.S. Pat. No. 4,670,915 to Evans discloses an interchangeable eyeshield which enables outdoor enthusiasts, who wear protective glasses in a variety of weather conditions, to shield their eyes from the various elements such as rain, overcast, sun and wind. Evans discloses an all weather eyeshield system comprising a plurality of interchangeable, frameless lenses, a pair of bows for holding a lens selected to be worn for a specific weather condition, and a means for releasably engaging each bow to the selected lens.

Although providing for interchangeability, light weight, comfort, and a stylish appearance, none of the foregoing, or similar frames would be suitable in safety eyewear applications. For safety eyeglasses, all of the advantages of a rimless or semi-rimless frame are desired, along with the requirement for safety eyeglass frames to be durable and provide a sturdy connection to safety lenses.

It is therefore an object of this invention to provide a rimless or semi-rimless eyeglass frame assembly. A further object of the invention is to provide a rimless or semi-rimless eyeglass frame assembly which can be used with corrective eyeglasses, sunglasses, as well as safety eyeglasses.

SUMMARY OF THE INVENTION

According to the present invention, a semi-rimless eyeglass frame assembly includes a lens secured in place by a three-point suspension consisting of a pair of endpiece assemblies and a nose bridge.

The eyeglass frame of the present invention includes an eyewire extending along the upper edge and along the side edges of a continuous lens, a nose bridge, and a pair of endpiece assemblies. The endpiece assemblies have channels for receipt of the eyewire and the lens and through holes on each side of the channel. The holes are aligned with apertures in the lens for receipt of means to secure the lens. The endpiece assemblies also comprise angled portions which are pivotally connected to temples.

In an alternative embodiment, the eyeglass frame of the present invention is rimless. A continuous lens is secured to endpiece assemblies and a nose bridge as described above, without the use of an eyewire.

In a preferred embodiment, a semi-rimless eyeglass frame assembly of the present invention includes an upper eyewire, a nose bridge, and a pair of endpieces all molded of a plastic material, such as nylon, as a single part. The endpieces have channels, for receipt of the lens, which include through holes on each side to align with apertures in the lens for receipt of means to secure the lens to the eyeglass frame assembly. The assembly, at the endpieces, has angled portions which are pivotally connected to temples.

Other objects and features of the present invention will become apparent from the following detailed description when taken in connection with the accompanying drawings. It is to be understood that the drawings are designed for the purpose of illustration only and are not intended as a definition of the limits of the invention.

BRIEF DESCRIPTION OF THE DRAWINGS

The foregoing and other objects and advantages of the invention will be appreciated more fully from the following drawings, in which.

DETAILED DESCRIPTION OF THE INVENTION

The semi-rimless eyeglass frame assembly of the present invention preferably includes an eyewire, a nose bridge, and a pair of endpiece assemblies.

Figure 1A:
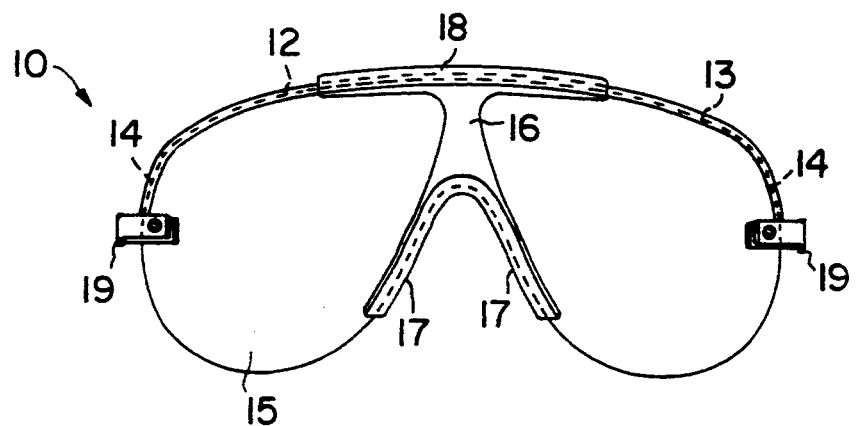
FIG. 1A is a front view of a semi-rimless eyeglass frame assembly according to the present invention.
Figure 1B:
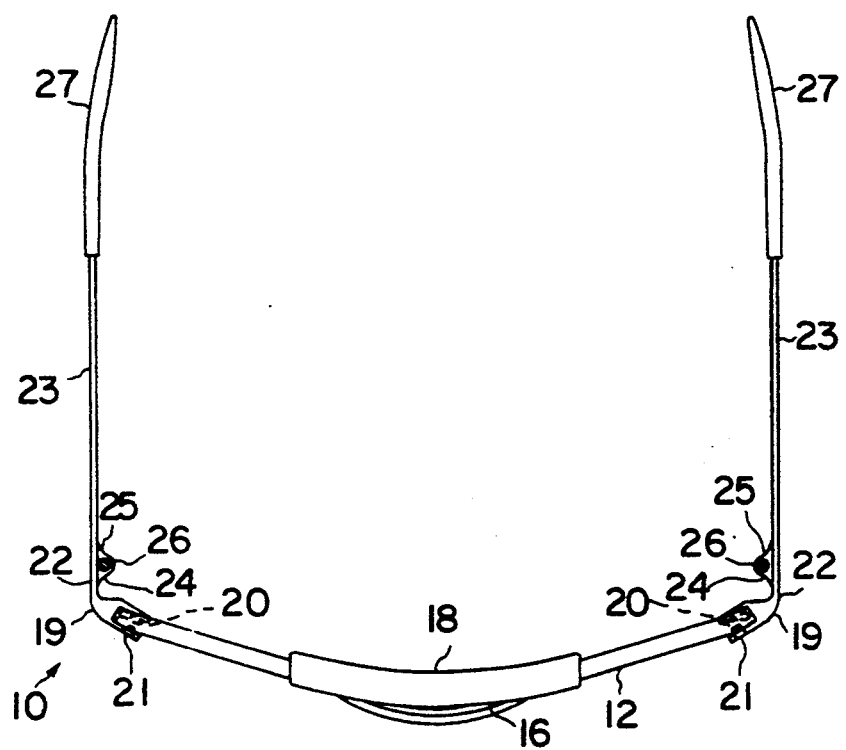
FIG. 1B is a top plan view of the frame shown in FIG. 1A.

Referring to FIGS. 1A and 1B, the semi-rimless eyeglass frame assembly 10 of the present invention includes an eyewire 12 extending along upper edge 13 and along side edges 14 of a continuous, one piece lens 15. A nose bridge 16, comprising nose pads 17 and eyewire support portion 18, is provided at the center of frame assembly 10. Endpiece assemblies 19 are located at side edges 14 of eyeglass frame assembly 10. Endpiece assemblies 19 each comprise an eyewire channel 30 (shown in FIG. 2) and a lens channel 20 for receipt of the eyewire 12 and lens 15. Endpiece assemblies 19 include through holes 21 on each side of lens channel 20 which are aligned with apertures (not shown) in lens 15 for receipt of means to secure lens 15. Endpiece assemblies 19 also comprise angled portions 22 which are pivotally connected to temples 23. An endpiece hinge 24 is attached to each angled portion 22, and a temple hinge 25 is attached to each temple 23. The respective hinge portions are pivotally connected by hinge screws 26. Temples 23 include ear portions 27 at the opposite ends for placement over the wearer's ears.

Figure 2:
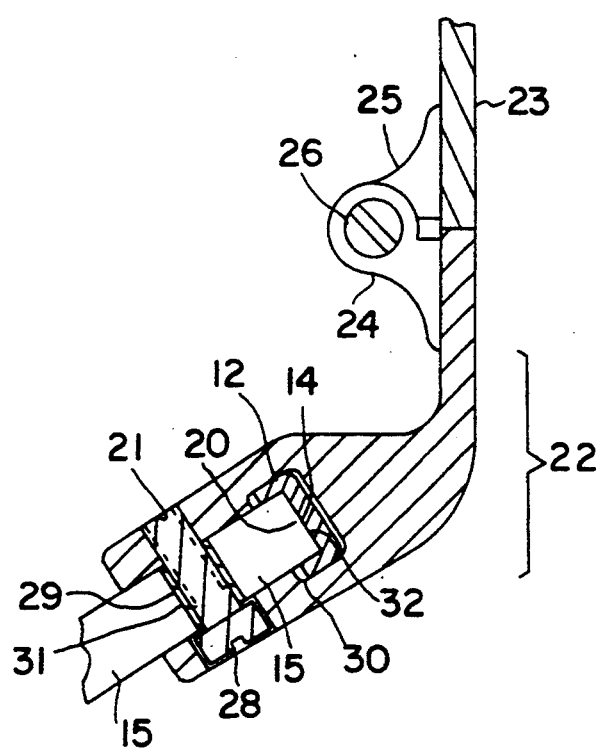
FIG. 2 is an exploded top view of the endpiece assembly utilized in the semi-rimless eyeglass frame assembly of the present invention.

Referring now to FIG. 2, an exploded cross-section of endpiece 19 is shown. Eyewire 12 covers the side edge 14 of lens 15. Lens 15 is placed in lens channel 20, and eyewire 12 is placed in eyewire channel 30. Apertures 31 in lens 15 are aligned with endpiece through holes 21 for receipt of lens 10 screws 28 and bushings 29 which help to secure lens 15. Endpiece assembly 19 also comprises angled portion 22 which is pivotally connected to temple 23 by means of an endpiece hinge portion 24 and a temple hinge portion 25 joined by hinge screw 26.

Eyewire 12 is typically constructed of a rigid material such as metal or plastic. Preferably, eyewire 12 is constructed of a metal material such as a nickel-silver alloy or stainless steel, or a plastic material such as nylon or polycarbonate. It is understood by those of skill in the art that other metal or plastic materials may be utilized in the construction of eyewire 12.

Eyewire 12 comprises a channel or groove 32 which covers the upper 13 and side edges 14 of lens 15. Eyewire 12 typically has a rectangular cross-section or groove 32 as shown in FIG. 2. Depending on the cut of lens 15 however, groove 32 may have any cross-sectional shape, such as V-shaped, or concave to secure a rounded edged lens.

Lens 15 may be a prescription lens to correct sight defects, a shaded lens to protect the user from the environment, or a safety lens to protect a user's eyes in, for example, an industrial environment. Typically, lens 15 is a single, continuous piece which covers both of the users eyes, and is provided in any style and shape desired by a user. Lens 15 is manufactured from a transparent material such as glass, or plastic materials such as polycarbonate. In safety glass applications, polycarbonate is the preferred material of construction due to its durability and high impact strength. Lens 15 is secured in position, as described above, by having the upper 13 and side edge 14 portions covered with eyewire 12. Eyewire groove 32, has a cross-sectional geometry which conforms to edges 13, 14.

Nose bridge 16 is typically manufactured as a single part. Preferably, nose bridge 16 is manufactured from a thermoplastic elastomer, which provides flexibility and comfort for users. Additionally, nose bridge constructions of this type are produced by injection molding processing, a relatively low cost manufacturing operation. The support portion 18 of nose bridge 16 is placed over eyewire 12 which secures upper edge 13 of lens 15. Support portion 18 of nose bridge 16 includes a groove shaped for receiving the outer portion of eyewire 12. The lower portion of nose bridge 16 includes nose pads 17, which have grooves corresponding to the lower nasal portion of lens 15. Nose bridge 16 is placed around the center portion of continuous lens 15 from the inside surface thereof and is snap-fit in place. The grooves, therefore, provided in the support 18 and lower nose pad portion 17 of nose bridge 16, extend over the exterior surface of lens 15, which is exposed over the nose of a wearer.

Endpiece assemblies 19 are provided at the side edges 14 of lens 15. The assemblies 19 are provided with lens channel 20 to secure lens 15 and a wider eyewire channel 30 to secure eyewire 12. Through holes 21 are provided on both sides of lens channels 20. The through holes 21 are aligned with each other, and are typically perpendicular to lens 15. Lens 15 is provided with apertures 31, which align with through holes 21 for receipt of means to secure lens 15 to frame assembly 10. Typically, a screw 28 is used to secure lens 15. Preferably, screw 28 is fitted with a bushing 29 to allow lens 15 to be tightly secured to endpiece assembly 19, due to the expansion of bushing 29 against the side walls of lens aperture 31 as lens screw 28 is tightened. Other means, such as a pin, wedge or the like, may be used to secure lens 15 to endpiece assemblies 19. Typically, lens screws 28 are manufactured from a corrosion resistant, rigid metal material. Preferably, lens screws 28 are manufactured from stainless steel or a nickel-silver alloy. When using an eyewire 12 constructed of a plastic material, it is preferred to use a nut or metal grommet with lens screw 28. Bushing 29 is typically manufactured from a plastic or any other suitable material to allow expansion within the lens apertures 31 as screw 28 is tightened. Preferably, bushings 29 are made from nylon.

Endpiece assemblies 19 comprise angled portions 22 which are pivotally connected to temples 23. The angle of portion 22 varies depending upon the size and shape of lens 15. The pivotal connections are provided by hinges, attached to endpiece assemblies 19 and temples 23. Endpiece hinges 24 are attached to angled portions 22 of endpiece assemblies 19. Corresponding temple hinges 25 are attached to temples 23. Hinge screws 26 are provided to pivotally connect the endpiece assemblies 19 with temples 23. Preferably, hinge portions 24, and 25 are soldered to their respective parts. Temples 23 are typically provided with ear portions 27 which sit over the tops of a user's ears to assist in supporting frame assembly 10 on a user's face.

Endpiece assemblies 19 are typically manufactured from the same material as eyewire 12. When using a plastic material, such as nylon, in the construction of the frame assembly 10, upper eyewire 12, nose bridge 16 and endpiece assemblies 19 may be molded as a single part. This construction provides a durable and sturdy connection for lens 15 to frame 10. Additionally, significant cost savings may be realized by utilizing a low cost injection molding process, and a more efficient assembly with fewer parts.

Figure 3A:
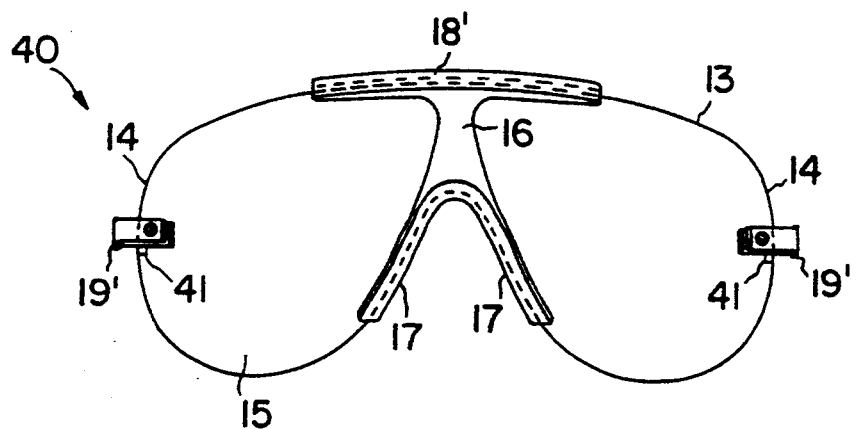
FIG. 3A is a front view of an alternative embodiment of the present invention.
Figure 3B:
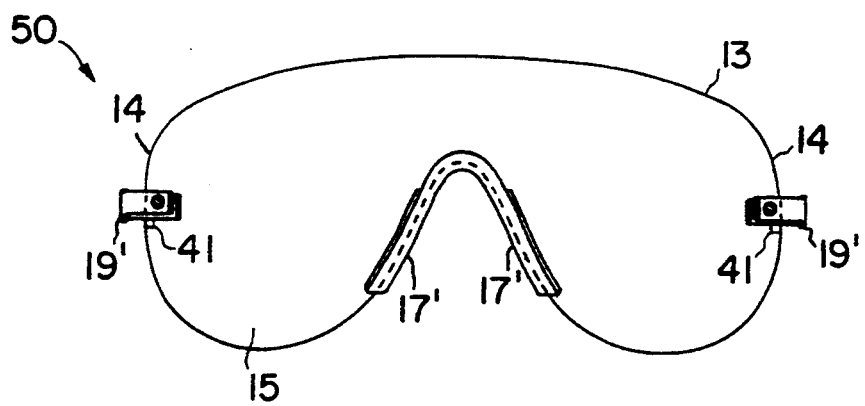
FIG. 3B is a front view of an alternative embodiment of the present invention.

Referring now to FIGS. 3A and 3B, alternative embodiments of the present invention are shown which include rimless eyeglass frame assemblies 40 and 50. With the exception of an eyewire (12 in FIGS. 1A, 1B and 2), frame assemblies 40 and 50 are similar to assembly 10 described above.

FIG. 3A shows a rimless frame assembly 40 for a continuous, one piece lens 15, having upper edge 13 and side edges 14. Nose bridge 16, comprising nose pad 17 and support portion 18' is located at the center of frame assembly 40. Endpiece assemblies 19' are located at side edges 14 of frame assembly 40. A notch 41 is provided on both side edges 14 to provide a shelf or horizontal support for endpiece assemblies 19'. Notch 41 also may be used as a positioning device for proper endpiece location during frame assembly manufacturing.

FIG. 3B, similarly, shows a rimless frame assembly 50 having all of the components described above. This embodiment utilizes nose pads 17' in place of the larger T-bridge-type nose bridge 16. Nose pads 17' may be secured to lens 15 with an attachment means, such as an adhesive, a pin, or a screw. More typically, nose pads 17' are snap-fit onto lens 15. A snap-fit construction of nose pads 17' and lens 15 is preferred due to the efficiency and cost savings associated with less manufacturing parts and time, as well as the simplicity of repair/replacement. It is noted that nose pad 17' can also be molded integrally with lens 15. This option, however, would limit the size and shape of lens 15.

Figure 4:
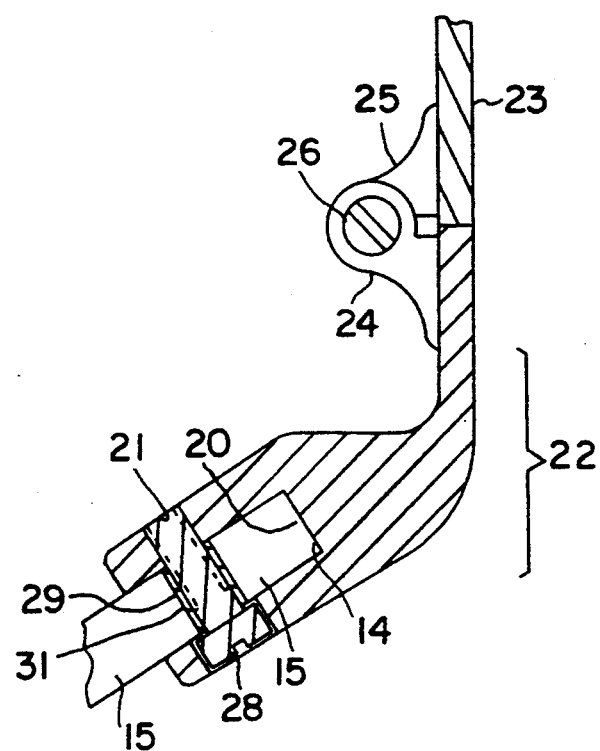
FIG. 4 is an exploded top view of the endpiece assembly utilized in the alternative embodiments shown in FIGS. 3A and 3B.

Referring now to FIG. 4, an exploded cross-section of endpiece assembly 19' is shown. As described above, endpiece assemblies 19' each comprise a lens channel 20 for receipt of lens 15, however, no eyewire or eyewire channel are utilized in the rimless embodiment shown in FIGS. 3A and 3B. All of the other component parts of the endpiece assemblies are as described above.

The present invention will be further illustrated by the following example, which is intended to be illustrative in nature and is not to be construed as limiting the scope of the invention.

EXAMPLE

One suitable construction of an eyeglass frame assembly having a shape and design substantially in accordance with the present invention is provided by the following combination of elements.

A nickel-silver alloy eyewire, having a rectangular channel cross-section of about 0.096 inch width and 0.035 inch depth is placed along the upper and side edges of a continuous safety lens. The continuous lens is made of polycarbonate plastic having a thickness of about 0.092 inch at the center portion. The upper and side edges of the lens are shaped to fit within the rectangular channel of the eyewire. A nose bridge, made of nylon plastic, is snapped on to the lens-eyewire assembly. The nose pad portion of the bridge has a channel in which the center portion of the lens rests, while the upper portion of the bridge has a channel of about 0.14 inch width to encompass the eyewire. The nose bridge is placed onto the eyeglass assembly from the inside, thereby exposing the center portion of the continuous lens.

A pair of nickel-silver alloy endpiece assemblies have a first channel of about 0.136 inch for receipt of the eyewire, and a second channel of about 0.096 inch for receipt of the lens. A pair of holes are centered 0.156 inch from the side edges of the lens. These holes are aligned with through holes on each side of the lens channel portion of the endpiece assembly. The holes at the side edges of the lens have a diameter of about 0.073 inch. The through holes in the endpiece assemblies have diameters of 0.11 inch in the outside portion of the lens channel and 0.055 inch on the inside portion of the lens channel. A nylon tube or bushing, of about 0.125 inch width, about 0.073 inch outside diameter and about 0.0525 inside diameter is placed in the holes located at the side edges of the lens once the lens and eyewire are placed into the endpiece assemblies and aligned with the through holes. A stainless steel lens screw having a about 0.053 inch diameter thread and about a 0.097 inch diameter head is then screwed into the bushing. The bushing expands as the screw is tightened, thereby securing the lens into the endpiece assemblies. The endpiece assemblies also have an angled portion in which a hinge is soldered and mated with a hinge soldered to a temple.

As is illustrated by the foregoing example, the lens is secured in position by having the upper edge and a portion of the side inserted into the eyewire channel and a nasal bridge that captures the lower nasal portion of the lens and the top surface of the eyewire. The eyeglass frame assembly of the present invention with three point suspension provides a durable and sturdy frame without compromising appearance, style and light weight comfort.

It should be understood that the foregoing description of the invention is intended merely to be illustrative thereof and that other embodiments and modifications may be apparent to those of skill in the art.

What is claimed is:

1. A semi-rimless eyeglass frame assembly comprising:

an eyewire extending along the upper and side edges of a single, continuous lens which covers both eyes; said eyewire having a groove for receipt of said lens
a nose bridge having a grooved support portion for receiving an outer portion of said eyewire and a nose pad portion having grooves for receiving a lower nasal portion of said lens; and
a pair of endpiece assemblies;
said endpiece assemblies comprising an eyewire channel for receipt of said eyewire, a lens channel for receipt of said lens, through holes on each side of said lens channel which are aligned with apertures in said lens for receipt of a bushing and at least one screw or pin to secure said lens, and an angled portion pivotally connected to a temple.

2. The semi-rimless eyeglass frame assembly as claimed in claim 1 wherein said lens is secured by a three point suspension comprising said endpiece assemblies and a locking action between said nose bridge and said upper eyewire.

3. The semi-rimless eyeglass frame assembly as claimed in claim 1, wherein said groove has a V-shaped cross-section.

4. The semi-rimless eyeglass frame assembly as claimed in claim 1, wherein said groove has a concave cross-sectional shape.

5. The semi-rimless eyeglass frame assembly as claimed in claim 1, wherein said groove has a rectangular cross-sectional shape.

6. The semi-rimless eyeglass frame assembly as claimed in claim 1 wherein said eyewire is constructed of a rigid, durable plastic material.

7. The semi-rimless eyeglass frame assembly as claimed in claim 1 wherein said eyewire is constructed of a rigid, durable metal material.

8. The semi-rimless eyeglass frame assembly as claimed in claim 6 wherein said plastic is nylon.

9. The semi-rimless eyeglass frame assembly as claimed in claim 7 wherein said metal is a nickel-silver alloy.

10. The semi-rimless eyeglass frame assembly as claimed in claim 1 wherein said eyewire, said nose bridge, and said endpieces is a unitary construction.

11. A semi-rimless eyeglass frame assembly comprising:

an eyewire extending along the upper and side edges of a single, continuous lens which cover both eyes;

said eyewire having a groove for receipt of said lens edges;

a nose bridge; and a pair of endpiece assemblies having a lens channel for receipt of said lens, through holes on each side of said lens channel which are aligned with apertures in said lens for receipt of a bushing and at least one screw or pin to secure said lens, and an angled portion pivotally connected to a temple;

wherein said eyewire, nose bridge and pair of endpiece assemblies are of a one-piece construction.

12. The semi-rimless eyeglass frame assembly as claimed in claim 11 comprising a pair of temples pivotally connected to said endpiece assemblies.

13. A rimless eyeglass assembly comprising:

a single, continuous lens which covers both eyes;

a nose bridge having a grooved nose pad portion for receiving a lower nasal portion of said lens; and a pair of endpiece assemblies having a lens channel for receipt of said lens, through holes on each side of said lens channel which are aligned with apertures in said lens for receipt of a bushing and at least one screw or pin to secure said lens, and an angled portion pivotally connected to a temple.

* * * * *